(12) United States Patent
German et al.

(10) Patent No.: US 7,832,694 B2
(45) Date of Patent: Nov. 16, 2010

(54) ADJUSTABLE MOUNTING CART FOR A WHITEBOARD AND PROJECTOR

(75) Inventors: Paul John German, Oconomowoc, WI (US); Allen Frater, Mequon, WI (US); John Clayton Mehnert, Madison, WI (US); Greg Falendysz, Sun Prairie, WI (US); James Frater, Madison, WI (US)

(73) Assignee: Speranza, Inc., Milwaukee, WI (US)

( * ) Notice: Subject to any disclaimer, the term of this patent is extended or adjusted under 35 U.S.C. 154(b) by 1005 days.

(21) Appl. No.: 11/611,660

(22) Filed: Dec. 15, 2006

(65) Prior Publication Data

US 2008/0142667 A1    Jun. 19, 2008

(51) Int. Cl.
*F16M 11/00* (2006.01)
(52) U.S. Cl. .................................... 248/125.8; 248/129
(58) Field of Classification Search ................ 248/129, 248/125.8, 125.9, 130, 161, 469, 447.2, 448; 353/79
See application file for complete search history.

(56) References Cited

U.S. PATENT DOCUMENTS

| | | | |
|---|---|---|---|
| 4,728,065 A * | 3/1988 | Coote .......................... | 248/129 |
| 6,179,426 B1 | 1/2001 | Rodriguez, Jr. et al. | |
| 6,334,684 B1 | 1/2002 | Yoshida et al. | |
| 6,394,609 B1 | 5/2002 | Rodriguez, Jr. et al. | |
| 6,485,146 B2 | 11/2002 | Rodriguez, Jr. | |
| 6,498,590 B1 | 12/2002 | Dietz et al. | |
| 6,530,664 B2 | 3/2003 | Vanderwerf et al. | |
| 6,540,366 B2 | 4/2003 | Keenan et al. | |
| 6,545,660 B1 | 4/2003 | Shen et al. | |
| 6,604,829 B2 | 8/2003 | Rodriguez, Jr. | |
| 6,747,636 B2 | 6/2004 | Martin | |
| 6,894,703 B2 | 5/2005 | Vernier et al. | |
| 6,962,271 B2 * | 11/2005 | Gregson, Jr. ................ | 222/166 |
| 2005/0263653 A1 * | 12/2005 | Brown, Jr. ............... | 248/125.9 |

OTHER PUBLICATIONS

Dietz, P., et al., "DiamondTouch: A Multi-User Touch Technology," Mitsubishi Electric Research Laboratories, http://www.merl.com, TR-2003-125, Oct. 2003.
"Your meeting just went digital . . . " PowerPoint presentation for 3M Digital Wall Display Plus Series, 2005.
"Products for Learning: Every Child Works Wonders, K-12," Smart Technologies catalog, printed Dec. 2005.
"Front projection," Smart Technologies, http://www2.smarttech.com/st/en-US/Products/SMART+Boards/Front+Projection/Features.htm , printed Jun. 2, 2006.

* cited by examiner

*Primary Examiner*—Ramon O Ramirez
(74) *Attorney, Agent, or Firm*—Bell & Manning, LLC

(57) ABSTRACT

A device for mounting a whiteboard and a projector is provided. The device comprises a base and a pole mounted to the base such that the pole is substantially perpendicular to a surface. The base comprises a transport mechanism which allows the device to be moved from a first location on the surface to a second location on the surface. The pole comprises a first mounting bracket and a second mounting bracket. The first mounting bracket is for mounting a whiteboard such that an interactive surface of the whiteboard is capable of being positioned in a plane of a plurality of planes, including a receiving plane. The second mounting bracket is for mounting a projector such that the projector is capable of projecting onto the whiteboard while the interactive surface of the whiteboard is positioned in the receiving plane.

19 Claims, 18 Drawing Sheets

ADJUSTABLE MOUNTING CART FOR A WHITEBOARD AND PROJECTOR

FIELD

The subject of the disclosure relates generally to a device for mounting a whiteboard and a projector. More specifically, the disclosure relates to a portable mounting cart in which a whiteboard and/or a projector can be used in a plurality of positions.

BACKGROUND

The use of electronic whiteboards is becoming more and more prevalent in corporate, factory, classroom, and other collaborative environments. An electronic whiteboard provides users with an interactive touch screen upon which a variety of actions can be performed. For example, electronic whiteboards are able to receive a projected image of a computer screen such that users can remotely control computer applications by touching the whiteboard. Electronic whiteboards can also allow users to annotate documents and web pages, take notes, save annotations and notes, give presentations, collaborate on-site or across a distance, etc.

In an educational environment, a whiteboard is an invaluable tool which can be used by students, teachers, and professors to enhance learning. A teacher can use the whiteboard to present notes, share information stored in computer applications, play video, browse the Internet, etc. Teachers can also have students walk up to the front of the class and interact with the whiteboard. In a typical classroom environment, the whiteboard is statically, vertically mounted on a classroom wall much in the same way as a traditional blackboard. A projector for projecting images onto the whiteboard is placed in front of and at some distance from the whiteboard. Unfortunately, this traditional projector/whiteboard arrangement inherently excludes a subset of students from interacting with the whiteboard and limits the overall effectiveness of the whiteboard.

It can be difficult or impossible for a student that is disabled, in a wheelchair, or on crutches to interact with a whiteboard which is statically, vertically mounted on a wall. Traditional whiteboards cannot be lowered, tilted, or moved to accommodate such students. As a result, students of limited means are prevented from interacting with the rest of their classmates. Further, utilizing a single whiteboard in a manner similar to a blackboard allows only one or a few students in the classroom to interact with the whiteboard at a given time. In addition, the position of the projector makes it easy for lectures to be disrupted as images from the projector are blocked by the lecturer, passersby, student movements such as raising a hand, etc.

In a work environment, in addition to being used as a teaching and presenting tool, whiteboards are also used to facilitate collaboration among coworkers. A group of workers can gather around the whiteboard and utilize the touch screen to control computer applications, design products, edit documents, compose documents and presentations, etc. In a typical workplace, whiteboards are statically, vertically mounted to an office or board room wall. Similar to a classroom environment, a projector for projecting images onto the whiteboard is placed in front of and at some distance from the whiteboard. As with students, it can be difficult or impossible for workers of limited means to take advantage of whiteboards which are statically, vertically mounted. Further, mounted whiteboards are not portable in the sense that they can easily be moved from one room to another or from one plant to another. Such immobility is inconvenient and can force a company to purchase more whiteboards than it needs. In addition, when a group of coworkers gathers around the whiteboard, images projected from the projector are often blocked. It can also be uncomfortable for a group of people to stand in front of a vertically mounted whiteboard for any length of time.

Thus, there is a need for a portable whiteboard mounting cart in which a whiteboard can be adjusted such that an interactive surface of the whiteboard can be in any of a plurality of planes relative to a surface. Further, there is a need for a portable whiteboard mounting cart to which a projector can be mounted such that images can be projected from above the whiteboard.

SUMMARY

A device for mounting a whiteboard and a projector is provided. The device comprises a base and a pole mounted to the base such that the pole is substantially perpendicular to a surface. The base comprises a transport mechanism which allows the device to be moved from a first location on the surface to a second location on the surface. The pole comprises a first mounting bracket and a second mounting bracket. The first mounting bracket is for mounting a whiteboard such that an interactive surface of the whiteboard is capable of being positioned in a plane of a plurality of planes, including a receiving plane. The second mounting bracket is for mounting a projector such that the projector is capable of projecting onto the whiteboard while the interactive surface of the whiteboard is positioned in the receiving plane.

A device for providing an interactive work environment is also provided. The device comprises a whiteboard and the above-described device for mounting a whiteboard and a projector. A method of assembling an interactive work station is also provided. The method comprises providing the above-described device for mounting a whiteboard and a projector, and mounting a whiteboard to the device.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings, wherein like numerals denote like elements.

DETAILED DESCRIPTION

Figure 1A:
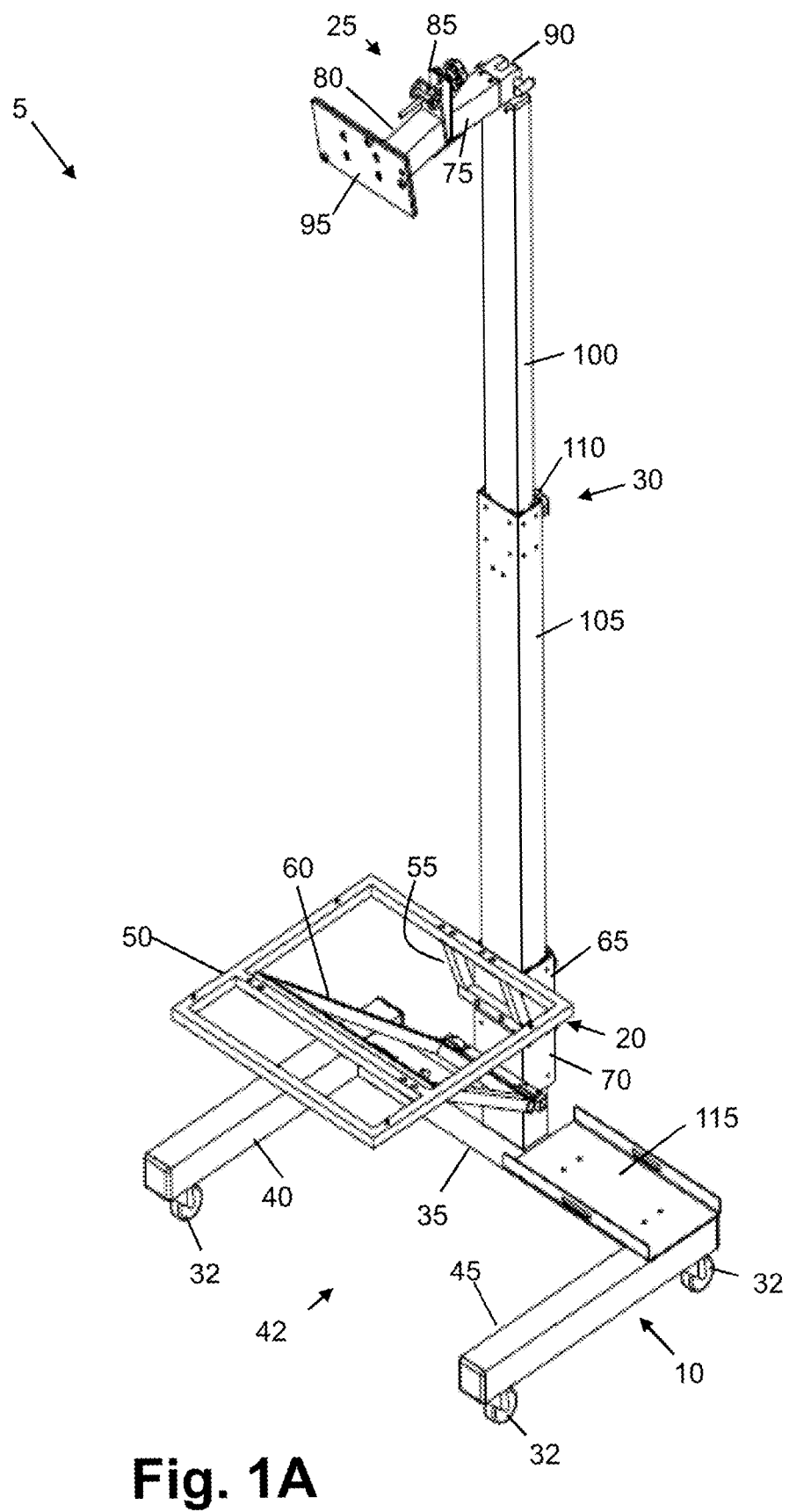
FIG. 1A is a front perspective view of a mounting cart with a mounting surface in a horizontal position in accordance with an exemplary embodiment.
Figure 1B:
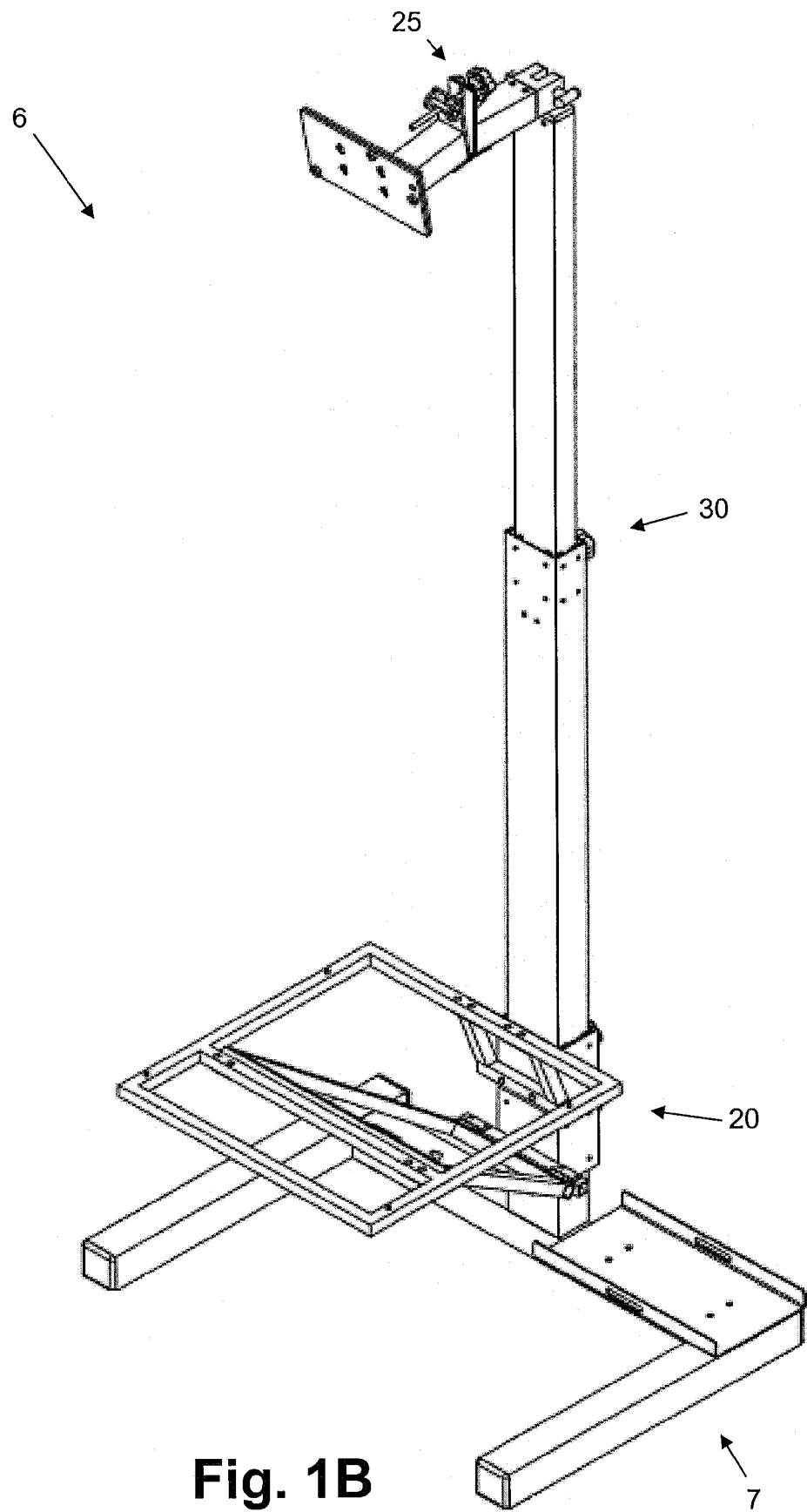
FIG. 1B is a front perspective view of a stationary mounting cart in accordance with an exemplary embodiment.

FIG. 1A illustrates a mounting cart 5 in accordance with an exemplary embodiment. The mounting cart 5 includes a base 10, a first mounting bracket 20, a second mounting bracket 25, and a telescoping pole 30. The base 10 includes rollers 32 such that the mounting cart 5 can easily be moved from a first location to a second location. In an exemplary embodiment, the mounting cart 5 can include four rollers 32, and one or more of the rollers 32 can include a locking mechanism such that the mounting cart 5 can be immobilized. Alternatively, the mounting cart can include any number of rollers. In another alternative embodiment, the mounting cart can be made portable by any other transport mechanism(s) known to those skilled in the art. For example, the transport mechanism can include any combination of one or more rollers, wheels, skis, tracks, tires, etc. The transport mechanism can also include one or more handles such that the mounting cart can be pushed, pulled, or rotated. In an alternative embodiment, the mounting cart can be stationary. FIG. 1B illustrates a mounting cart 6 in which a base 7 of the mounting cart 6 does not include a transport mechanism. The base 7 of the mounting cart 6 can rest on feet (not shown), pedestals, or any other platform(s). Alternatively, the base 7 of the mounting cart 6 can rest directly on a surface.

Referring back to FIG. 1A, the base 10 also includes a first base member 35, a second base member 40 mounted to the first base member 35, and a third base member 45 mounted to the first base member 35. As used in this disclosure, the term "mount" can include join, unite, connect, associate, insert, hang, hold, affix, attach, fasten, bind, paste, secure, bolt, nail, glue, screw, rivet, solder, weld, and other like terms. The second base member 40 and the third base member 45 can be mounted to the first base member 35 at right angles to form a partial rectangle such that a clear path 42 is provided. The clear path 42 allows a wheelchair or other chair to easily be positioned adjacent to and/or underneath a mounting surface 50 for receiving a whiteboard. In alternative embodiments, any number of base members can be used, and the base members can be arranged in any way which provides easy access to a whiteboard mounted to the mounting surface. For example, two base members can be arranged in a V shape, three base members can be arranged as a triangle, a single, semi-circular base member can be used, etc. The base 10 also includes a support surface 115 capable of receiving a computer box or other hardware.

In a first exemplary embodiment, the first mounting bracket 20 includes a lower clamp 70, an upper clamp 65, the mounting surface 50, an upper mounting surface stabilizer 55, and a lower mounting surface stabilizer 60. The mounting surface 50 is capable of receiving a whiteboard (not shown). The upper mounting surface stabilizer 55 is mounted to both the mounting surface 50 and the upper clamp 65 of the first mounting bracket 20. The lower mounting surface stabilizer 60 is mounted to both the mounting surface 50 and the lower clamp 70 of the first mounting bracket 20. The lower clamp 70 and upper clamp 65 are able to slide independently of one another along the telescoping pole 30 such that the mounting surface 50 can be positioned in a plurality of planes relative to a surface (not shown). The surface can be any ground or floor surface upon which the mounting cart 5 is placed. The lower clamp 70 and upper clamp 65 are also able to slide along the telescoping pole 30 in tandem such that an overall height of the mounting surface 50 relative to the surface can be adjusted. As illustrated in FIG. 1A, the mounting surface 50 is positioned in a plane parallel to the surface. The first mounting bracket 20 is described in more detail with reference to FIGS. 4-5.

In a first exemplary embodiment, the second mounting bracket 25 includes a first bracket leg 75, a second bracket leg 80, a bracket leg adjustment mechanism 85, a pivot mechanism 90, and a mounting plate 95. The mounting plate 95 is capable of receiving a projector (not shown). The mounting plate 95 can be statically or pivotally mounted to the second bracket leg 80 depending on the embodiment. The pivot mechanism 90 allows the first bracket leg 75 to be positioned at a plurality of angles relative to the telescoping pole 30. As illustrated in FIG. 1A, the first bracket leg 75 is positioned at a ninety degree angle relative to the telescoping pole 30. In this position, a projector mounted to the mounting plate 95 can project in a downward direction. The bracket leg adjustment mechanism 85 allows the second bracket leg 80 to be positioned at a plurality of angles relative to the first bracket leg 75. As illustrated in FIG. 1A, the second bracket leg 80 is positioned at approximately a five degree angle relative to the first bracket leg 75. The second mounting bracket 25 is described in more detail with reference to FIGS. 7-8.

The telescoping pole 30 includes a first pole section 100, a second pole section 105, and a pole adjustment mechanism 110. In an exemplary embodiment, the first pole section 100 slidably fits into the second pole section 105 such that a distance between a mounted projector and a mounted whiteboard can be adjusted via the pole adjustment mechanism 110. In an alternative embodiment, the roles of the first pole section and the second pole section can be reversed such that the second pole section slidably fits into the first pole section. In another alternative embodiment, a non-telescoping pole can be used and the first and/or second mounting brackets can slide along the non-telescoping pole such that a distance between the projector and the whiteboard can be adjusted. The telescoping pole 30 is described in more detail with reference to FIG. 6.

Figure 2:
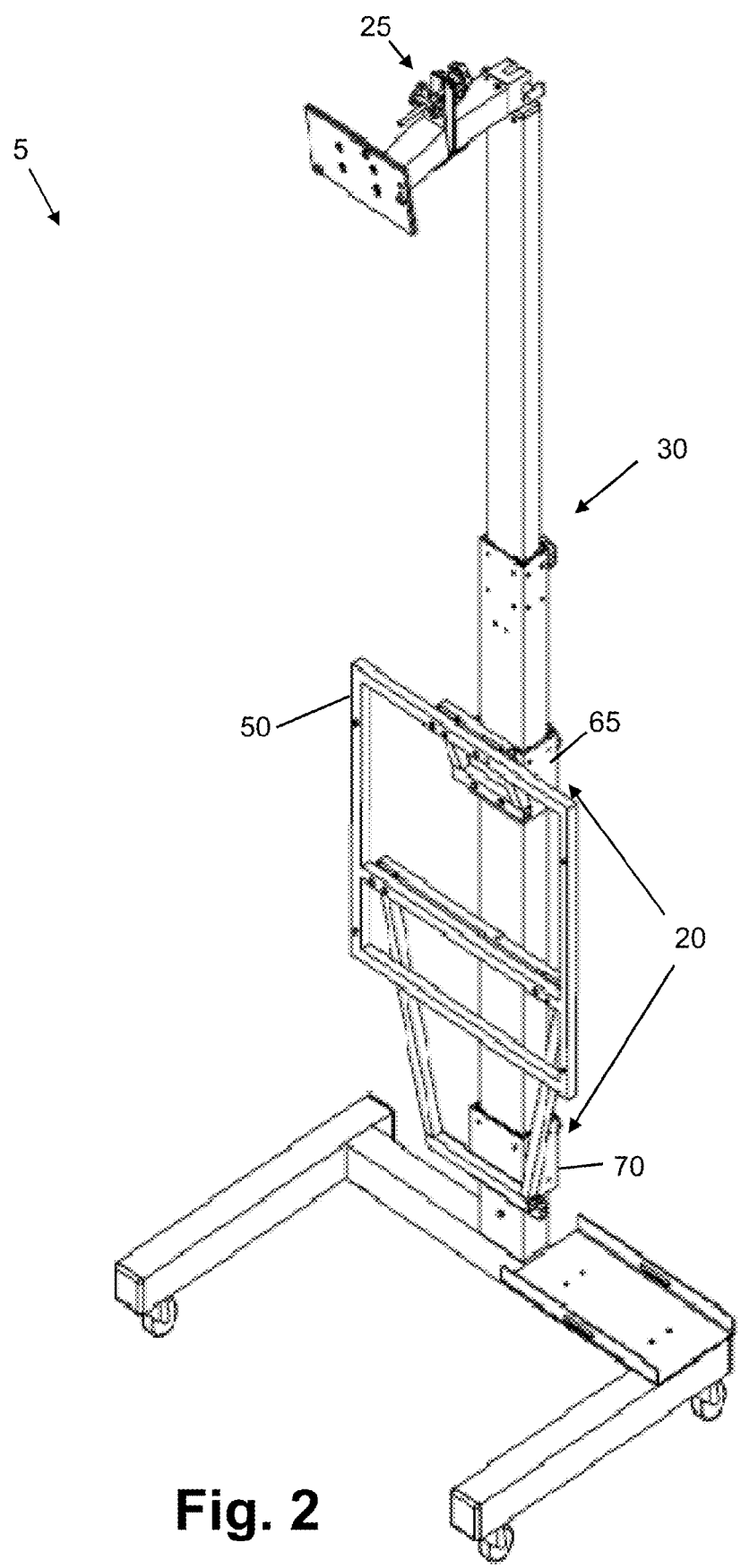
FIG. 2 is a front perspective view of a mounting cart with the mounting surface in a vertical position in accordance with an exemplary embodiment.
Figure 3:
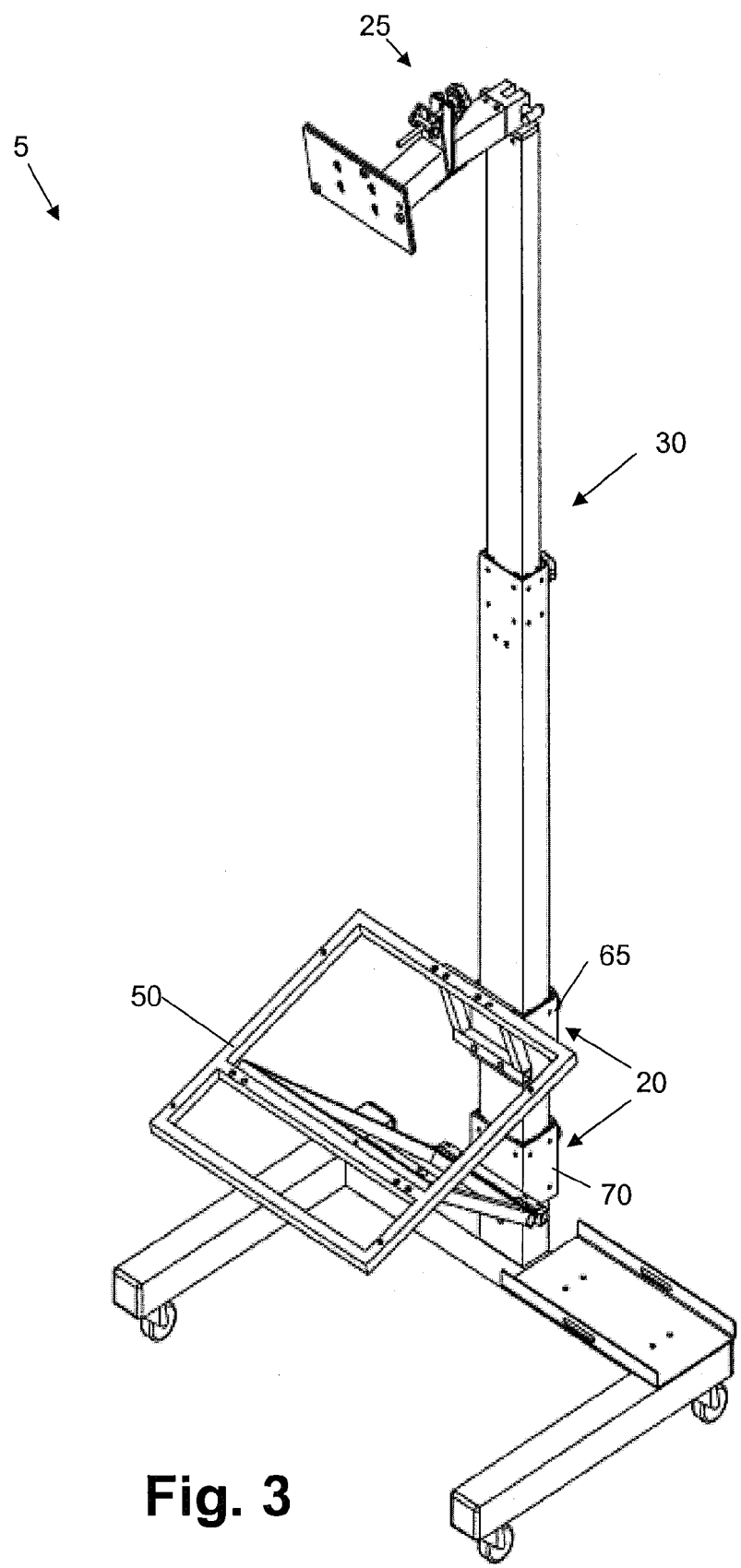
FIG. 3 is a front perspective view of a mounting cart with the mounting surface positioned at an angle in accordance with an exemplary embodiment.

FIG. 2 illustrates a mounting cart 5 in which the upper clamp 65 and the lower clamp 70 are positioned such that the mounting surface 50 of the first mounting bracket 20 is positioned in a plane perpendicular to a surface (not shown). Similarly, FIG. 3 illustrates a mounting cart 5 in which the upper clamp 65 and the lower clamp 70 are positioned such that the mounting surface 50 of the first mounting bracket 20 is positioned in a plane that is at an angle of approximately fifteen degrees relative to a surface (not shown). In an exemplary embodiment, the upper clamp 65 and the lower clamp 70 can be adjusted such that the mounting surface 50 of the first mounting bracket 20 is positioned in a plane that is at any angle between zero (horizontal) and ninety (vertical) degrees relative to the surface.

Figure 4:
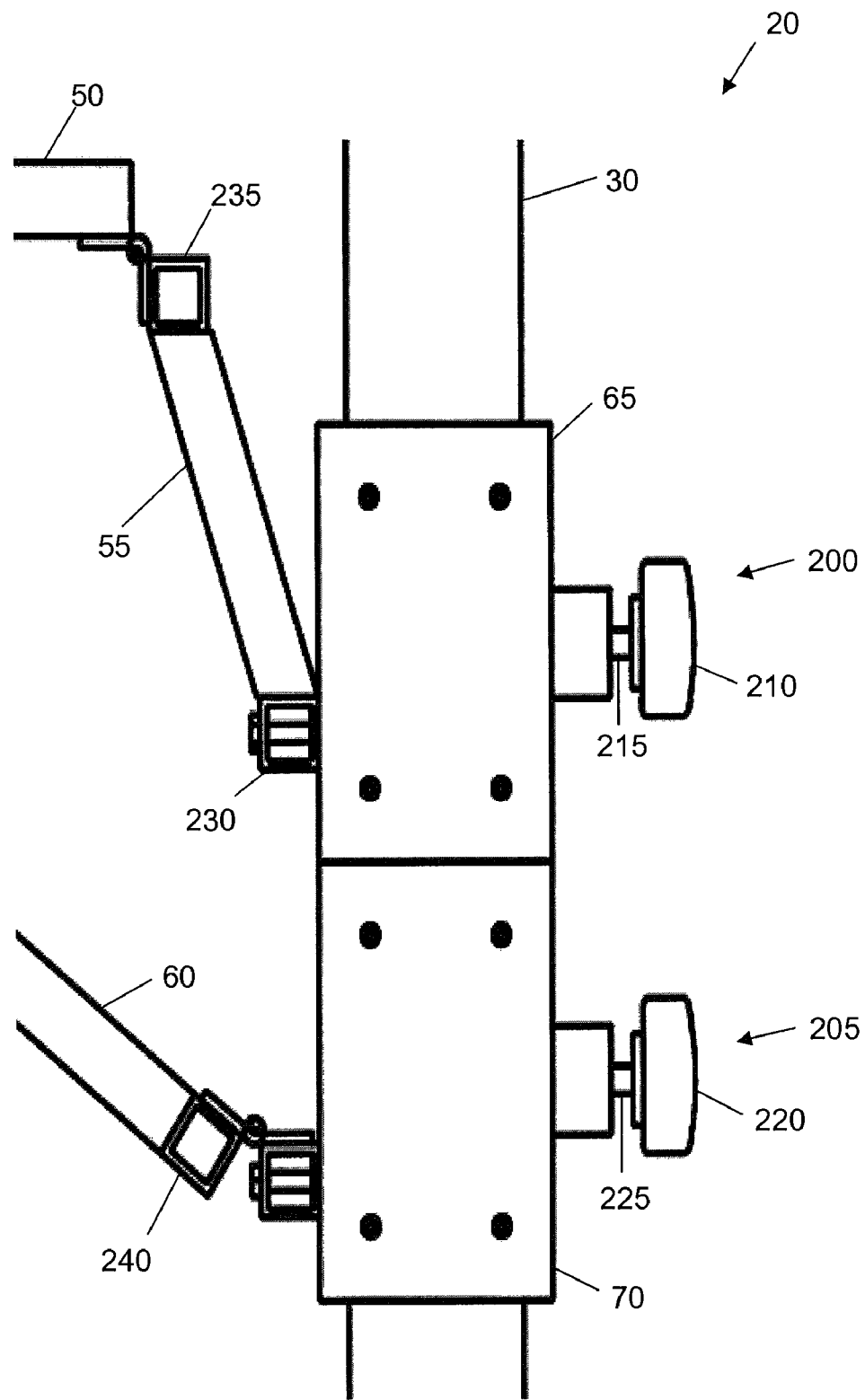
FIG. 4 is a side view of a first mounting bracket in accordance with a first exemplary embodiment.

FIG. 4 illustrates a first mounting bracket 20 in accordance with a first exemplary embodiment. The upper clamp 65 includes an upper clamp adjustment mechanism 200 and the lower clamp 70 includes a lower clamp adjustment mechanism 205. The upper clamp adjustment mechanism 200 includes an upper clamp handle 210 and an upper clamp pin 215. Similarly, the lower clamp adjustment mechanism 205 includes a lower clamp handle 220 and a lower clamp pin 225. In an exemplary embodiment, the telescoping pole 30 can include a plurality of vertically spaced holes to facilitate height and angle adjustment of the mounting surface 50. As such, the mounting surface 50 can easily be placed into a plurality of predetermined positions. The upper clamp 65 can be secured to the telescoping pole 30 by pushing the upper clamp handle 210 such that the upper clamp pin 215 is inserted into a desired hole in the telescoping pole 30. The position of the upper clamp 65 can be adjusted by pulling the upper clamp handle 210 to release the upper clamp pin 215, sliding the upper clamp 65 to a desired position along the telescoping pole 30, and pushing or releasing the upper clamp handle 210 such that the upper clamp pin 215 is inserted into a desired hole in the telescoping pole 30. Similarly, the lower clamp 70 can be secured and adjusted by using the lower clamp handle 220 to insert the lower clamp pin 225 into a desired hole in the telescoping pole 30.

In an alternative embodiment, the upper clamp pin and lower clamp pin can be threaded. The upper clamp handle and lower clamp handle can be used to screw the upper clamp pin and lower clamp pin into threaded holes within the telescoping pole. In another alternative embodiment, the upper clamp pin and the lower clamp pin can be threaded and the telescoping pole can be without holes such that the mounting surface can be placed in any position. The upper clamp and the lower clamp can be secured to the telescoping pole by turning the upper clamp handle and the lower clamp handle such that the upper clamp pin and the lower clamp pin frictionally contact the telescoping pole. The upper clamp pin and the lower clamp pin can also be spring-loaded such that a spring force pushes the upper clamp pin and the lower clamp pin toward the telescoping pole. Alternatively, the upper clamp and the lower clamp can be movably secured to the telescoping pole by any other method known to those skilled in the art.

The mounting surface 50 is connected to the upper clamp 65 through the upper mounting surface stabilizer 55. The upper mounting surface stabilizer 55 includes a first end 230 mounted to the upper clamp 65 and a second end 235 mounted to the mounting surface 50. In an exemplary embodiment, the first end 230 of the upper mounting surface stabilizer 55 is statically mounted to the upper clamp 65 and the second end 235 of the upper mounting surface stabilizer 55 is pivotally mounted to the mounting surface 50. Alternatively, the first end 230 of the upper mounting surface stabilizer 55 can be statically or pivotally mounted to the upper clamp 65 and the second end 235 can be statically or pivotally mounted to the mounting surface 50. Statically mounted can refer to any fixed mounting which does not allow translation, rotation, or pivoting of the lower or upper mounting surface stabilizer. Pivotally mounted can refer to any mounting which allows the lower or upper mounting surface stabilizer to pivot. A pivotal mount can be provided by a hinge, pivot bracket, or any other mechanism which enables a pivoting motion. The mounting surface 50 is connected to the lower clamp 70 through the lower mounting surface stabilizer 60. The lower mounting surface stabilizer 60 includes a first end 240 and a second end (not shown). In an exemplary embodiment, the first end 240 is pivotally mounted to the lower clamp 70 and the second end is pivotally mounted to the mounting surface 50. Alternatively, the first end 240 of the lower mounting surface stabilizer 60 can be pivotally or statically mounted to the lower clamp 70 and the second end can be pivotally or statically mounted to the mounting surface 50.

Figure 5:
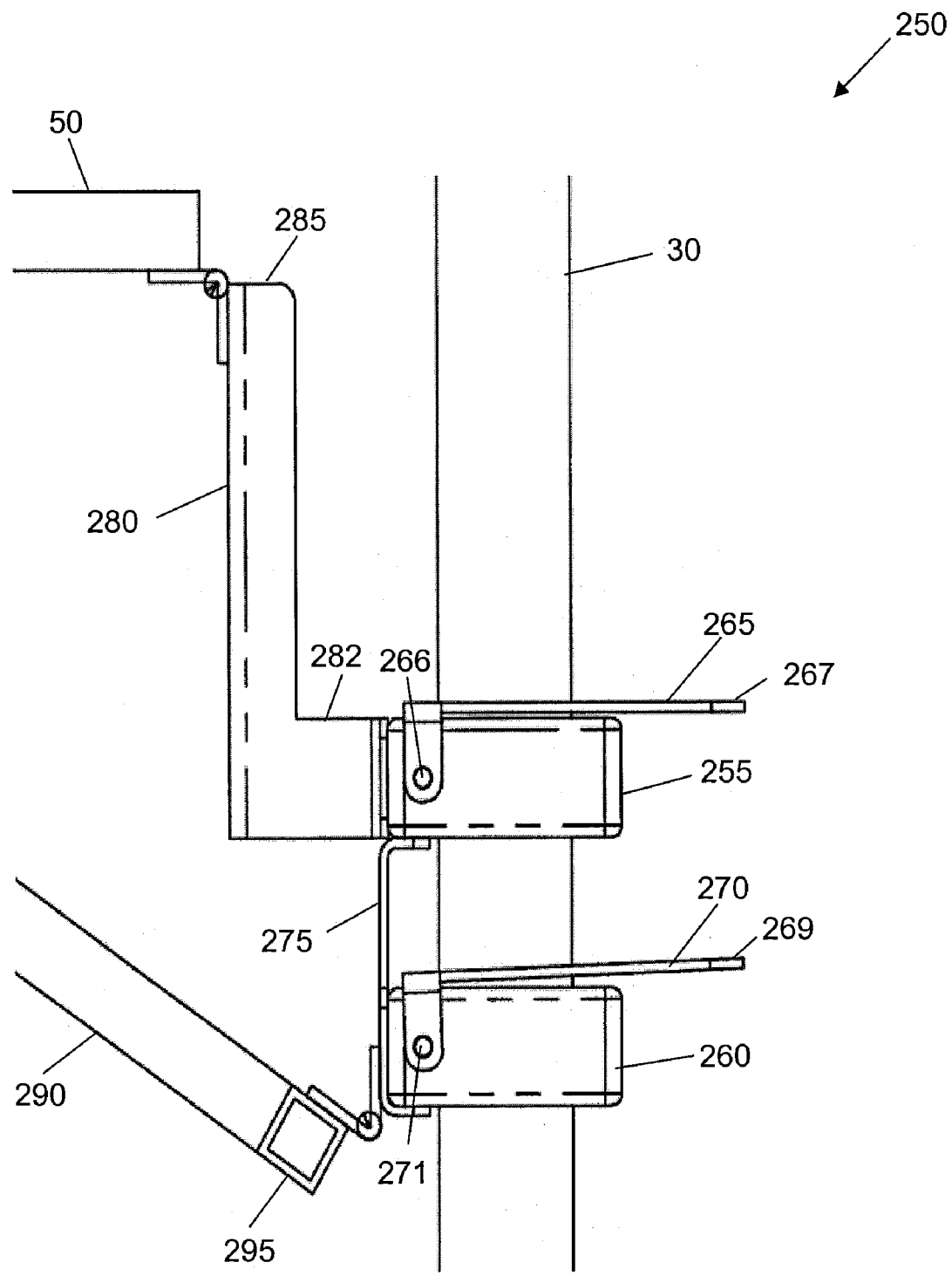
FIG. 5 is a side view of a first mounting bracket in accordance with a second exemplary embodiment.

FIG. 5 illustrates a first mounting bracket 250 in accordance with a second exemplary embodiment. The first mounting bracket 250 includes an upper clamp 255, a lower clamp 260, an upper mounting surface stabilizer 280, a lower mounting surface stabilizer 290, and the mounting surface 50. The upper clamp 255 includes an upper clamp adjuster 265. The upper clamp adjuster 265 can be mounted to the upper clamp 255 with a first mounting pin 266 such that an end 267 of the upper clamp adjuster 265 can be raised and lowered. The end 267 can be raised to frictionally hold the upper clamp 255 to the telescoping pole 30 or lowered such that the upper clamp 255 can be moved along the telescoping pole 30. As illustrated in FIG. 5, the end 267 of the upper clamp adjuster 265 is in a lowered position. The lower clamp 260 includes a lower clamp adjuster 270 and a stopper 275. The lower clamp adjuster 270 can be mounted to the lower clamp 260 with a second mounting pin 271 such that an end 269 of the lower clamp adjuster 270 can be raised and lowered. The end 269 of the lower clamp adjuster 270 can be raised to frictionally hold the lower clamp 260 to the telescoping pole 30 or lowered such that the lower clamp 260 can be moved along the telescoping pole 30. As illustrated in FIG. 5, the lower clamp adjuster 270 is in a raised position. The stopper 275 can be used to keep a minimum distance between the upper clamp 255 and the lower clamp 260 such that the upper clamp 255 does not interfere with the lower clamp adjuster 270.

The mounting surface 50 is connected to the upper clamp 255 through the upper mounting surface stabilizer 280. The upper mounting surface stabilizer 280 includes a first end 282 mounted to the upper clamp 255 and a second end 285 mounted to the mounting surface 50. In an exemplary embodiment, the first end 282 of the upper mounting surface stabilizer 280 is statically mounted to the upper clamp 255 and the second end 285 of the upper mounting surface stabilizer 280 is pivotally mounted to the mounting surface 50. Alternatively, the first end 282 of the upper mounting surface stabilizer 280 can be statically or pivotally mounted to the upper clamp 255 and the second end 285 can be statically or pivotally mounted to the mounting surface 50. The mounting surface 50 is connected to the lower clamp 260 through the lower mounting surface stabilizer 290. The lower mounting surface stabilizer 290 includes a first end 295 and a second end (not shown). In an exemplary embodiment, the first end 295 is pivotally mounted to the lower clamp 260 and the second end is pivotally mounted to the mounting surface 50. Alternatively, the first end 295 of the lower mounting surface stabilizer 290 can be pivotally or statically mounted to the lower clamp 260 and the second end can be pivotally or statically mounted to the mounting surface 50.

Figure 6:
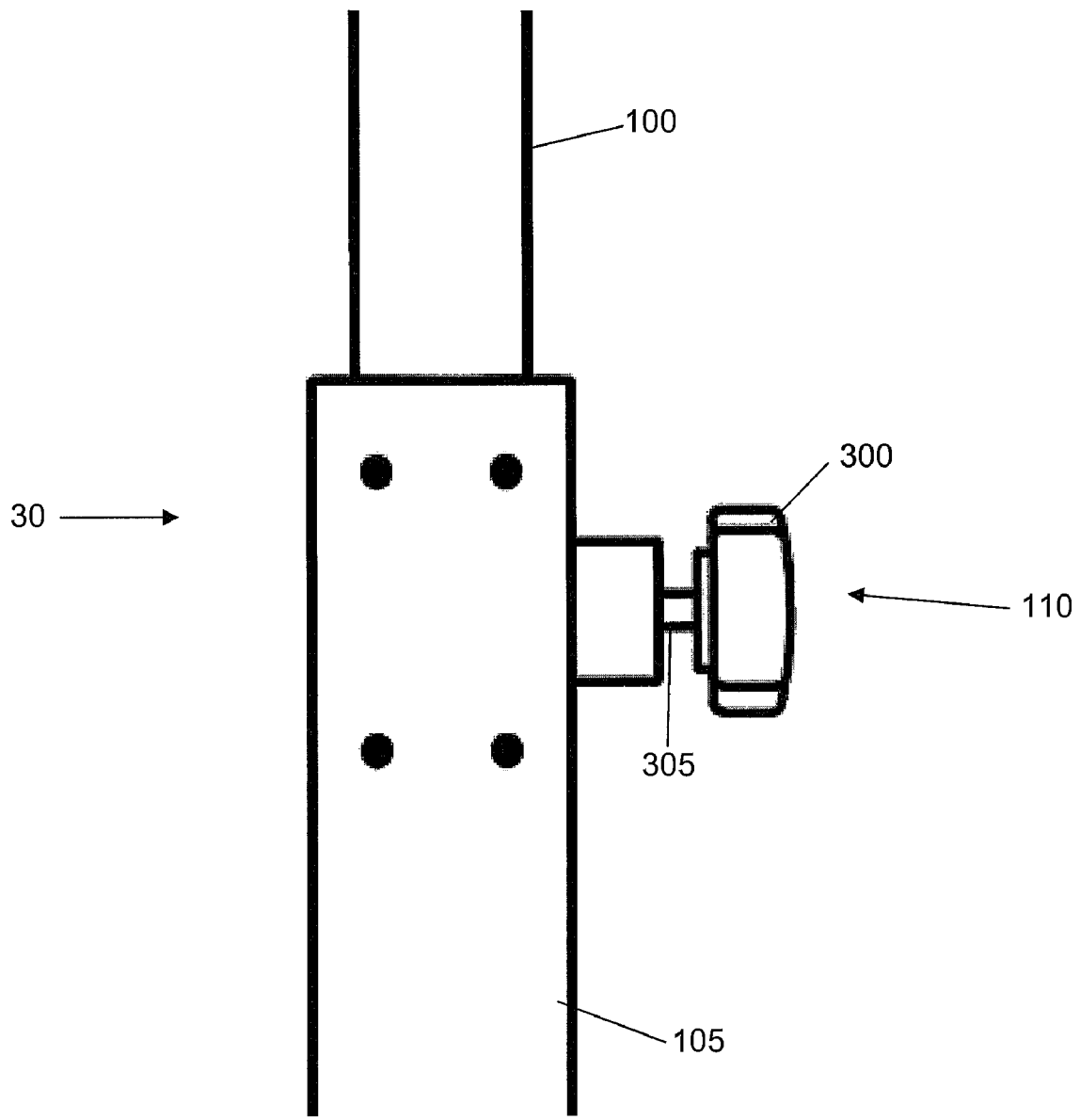
FIG. 6 is a side view of a pole adjustment mechanism for a telescoping pole in accordance with an exemplary embodiment.

FIG. 6 illustrates a pole adjustment mechanism 110 for the telescoping pole 30 in accordance with an exemplary embodiment. The pole adjustment mechanism 110 includes a pole handle 300 and a pole pin 305. In an exemplary embodiment, the first pole section 100 of the telescoping pole 30 can include a plurality of vertically spaced holes capable of receiving the pole pin 305. The pole handle 300 can be used to place the pole pin 305 into a hole in the first pole section 100 corresponding to a desired telescoping pole 30 height. Alternatively, the pole pin can hold the first pole section in place by frictionally resting against the first pole section. The pole pin 305 can be spring-loaded, threaded, or non-threaded depending on the embodiment. In one embodiment, the telescoping pole 30 can be used to immobilize the mounting cart. A bottom end of the telescoping pole 30 can frictionally contact a surface and/or a top end of the telescoping pole 30 can frictionally contact a ceiling surface such that the mounting cart is unable to be moved.

Figure 7:
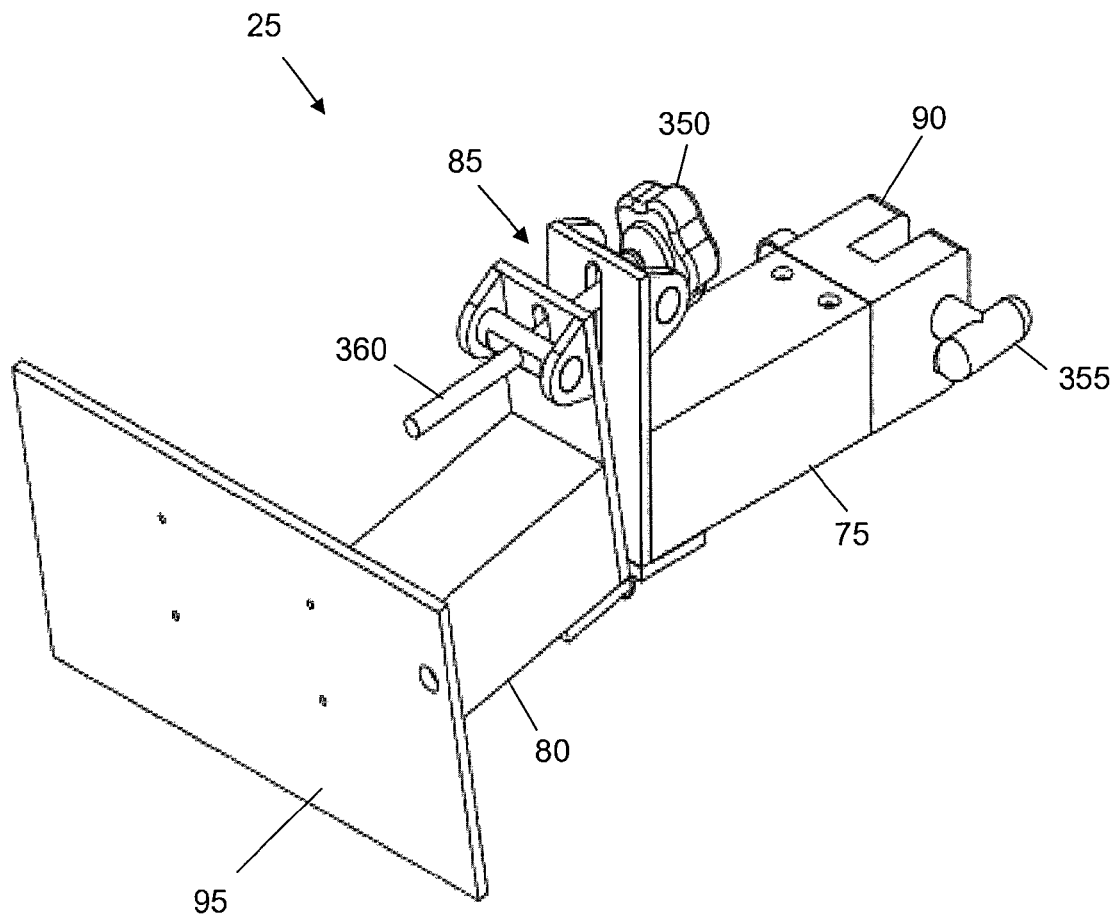
FIG. 7 is a perspective view of a second mounting bracket in accordance with an exemplary embodiment.

FIG. 7 illustrates a second mounting bracket 25 in accordance with an exemplary embodiment. The bracket adjustment mechanism 85 and the pivot mechanism 90 can be used to place the mounting plate 95 in a desired position such that a projector mounted to the mounting plate 95 projects at a desired angle. A pivot mechanism handle 355 of the pivot mechanism 90 can be used to position the first bracket leg 75 parallel to the telescoping pole such that a projector mounted to the mounting plate 95 is capable of projecting onto a wall independent of the mounting surface 50. The pivot mechanism handle 355 can also be used to position the first bracket leg 75 perpendicular to the telescoping pole such that a projector mounted to the mounting plate 95 is capable of projecting onto a whiteboard mounted to the mounting surface 50. In an exemplary embodiment, the pivot mechanism 90 is capable of positioning the first bracket leg 75 parallel or perpendicular to the telescoping pole. Alternatively, the pivot mechanism can be used to position the first bracket leg at any angle relative to the telescoping pole.

The bracket adjustment mechanism 85 includes a handle 350 and a pin 360. The handle 350 can be used to adjust the second bracket leg 80 relative to the first bracket leg 75 such that a desired angle of projection can be obtained. For example, if a whiteboard is mounted to the mounting cart at a fifteen degree angle relative to a surface, the bracket adjustment mechanism 85 can be used to position the second bracket leg 80 at a fifteen (or other) degree angle relative to the first bracket leg 75 such that a projector mounted to the mounting plate 95 can fully project onto the whiteboard. In an exemplary embodiment, the pin 360 can be threaded such that an angle between the first bracket leg 75 and the second bracket leg 80 can be adjusted by turning the handle 350. Alternatively, the pin can be unthreaded and the angle between the first bracket leg and the second bracket leg can be adjusted by any method known to those skilled in the art. In an alternative embodiment, the second mounting bracket can also include a locking mechanism such that a projector cannot be easily removed from the mounting plate.

Figure 8:
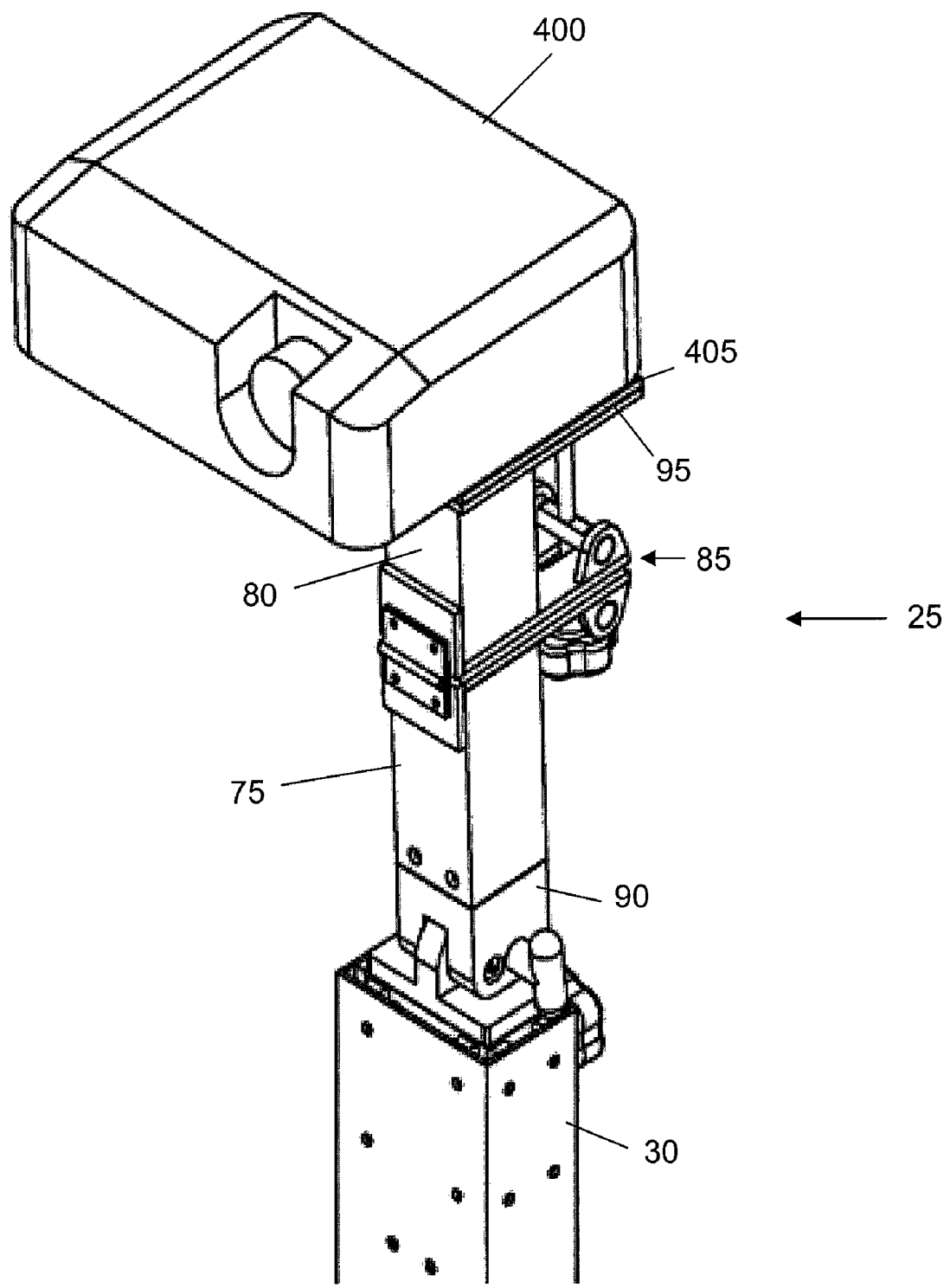
FIG. 8 is a perspective view of a projector mounted to the second mounting bracket in accordance with an exemplary embodiment.

FIG. 8 illustrates a projector 400 mounted to the second mounting bracket 25 in accordance with an exemplary embodiment. A projector plate 405 is mounted onto the mounting plate 95 and the projector 400 is mounted onto the projector plate 405. Alternatively, the projector can be mounted directly onto the mounting plate. In an exemplary embodiment, the projector 400 can be mounted to the mounting plate 95 or the projector plate 405 with screws. Alternatively, the projector can be mounted by any method known to those skilled in the art. The pivot mechanism 90 is positioned such that the first bracket leg 75 is parallel to the telescoping pole 30, and the bracket adjustment mechanism 85 is positioned such that the angle between the first bracket leg 75 and the second bracket leg 80 is one hundred eighty degrees. As such, the projector 400, as illustrated in FIG. 8, is positioned to project onto a wall which is independent of the mounting surface 50.

Figure 9:
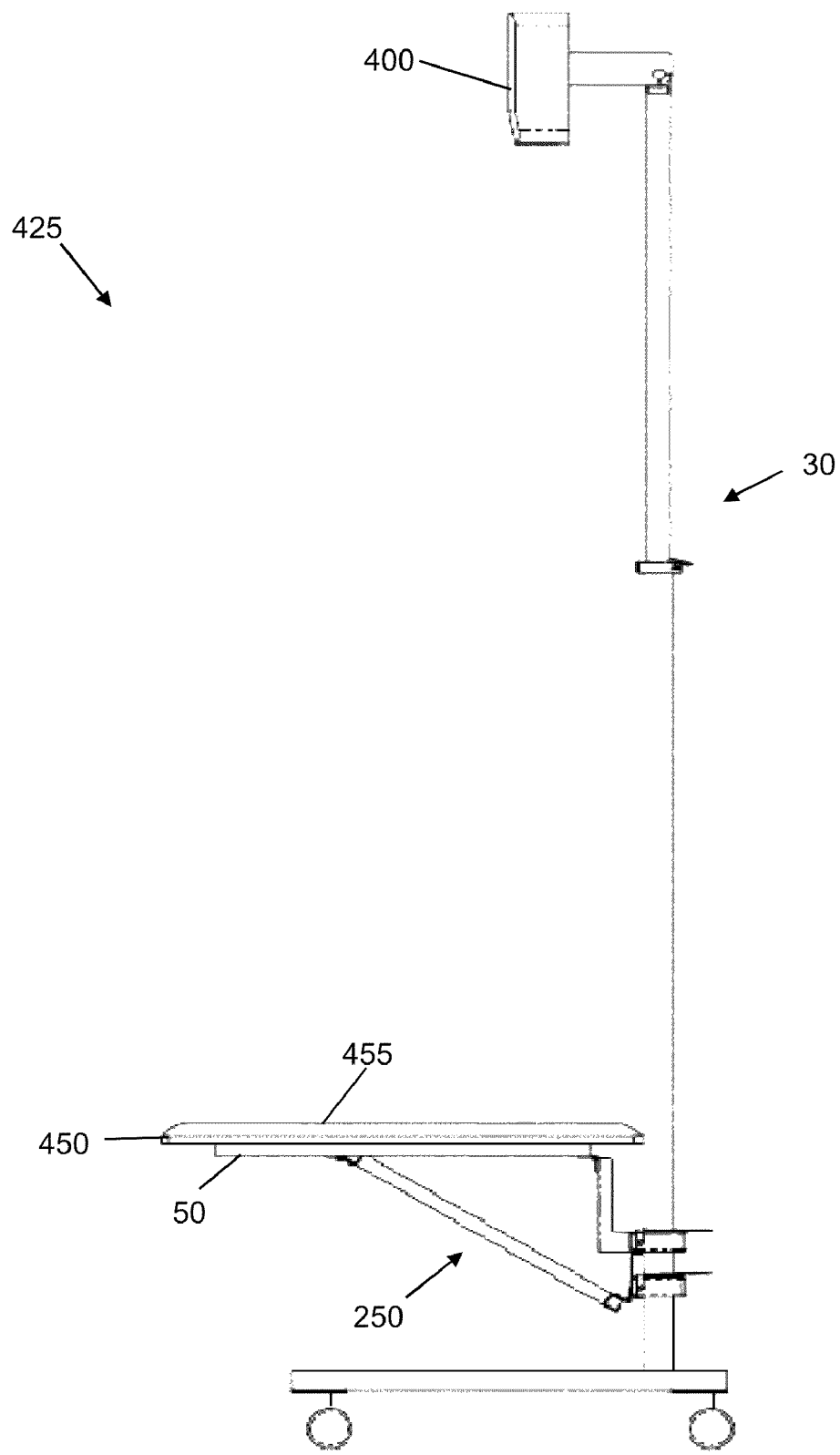
FIG. 9 is a side view of a mounting cart with a whiteboard mounted to a mounting surface and positioned horizontally in accordance with an exemplary embodiment.
Figure 10:
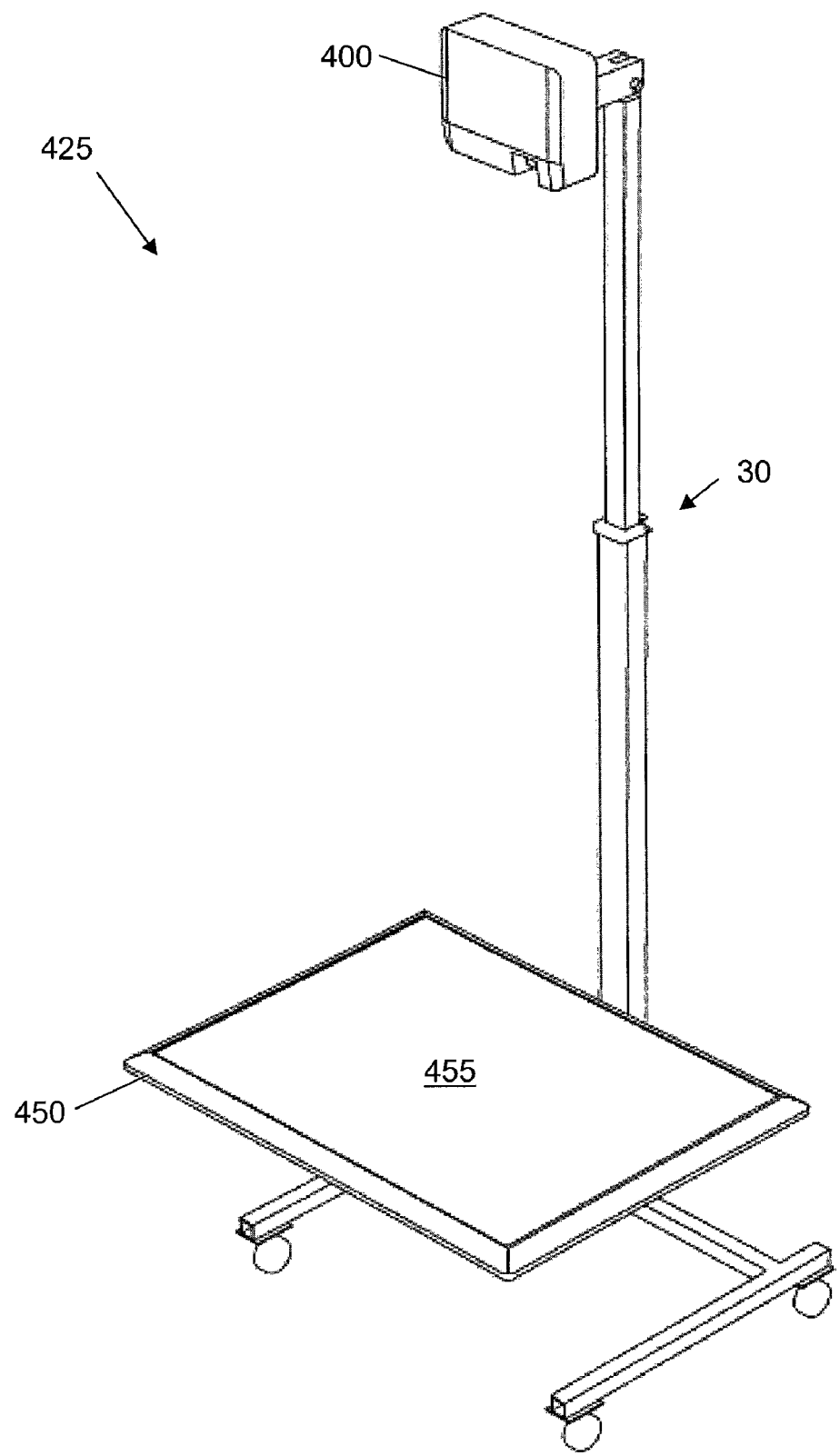
FIG. 10 is a front perspective view of the mounting cart with the whiteboard mounted to the mounting surface and positioned horizontally in accordance with an exemplary embodiment.

FIG. 9 is a side view of a mounting cart 425 illustrating a whiteboard 450 mounted to the mounting surface 50 and positioned horizontally in accordance with an exemplary embodiment. In an exemplary embodiment, the whiteboard 450 can be mounted to the mounting surface 50 with screws. Alternatively, the whiteboard can be mounted to the mounting surface in any manner known to those skilled in the art. The whiteboard 450 can include an interactive surface 455 upon which images can be projected. In the exemplary embodiment of FIG. 9, the whiteboard 450 is mounted to the mounting surface 50 of the first mounting bracket 250. A projector 400 is also mounted to the mounting cart 425 such that images can be projected onto the interactive surface 455 of the whiteboard 450. FIG. 10 is a perspective view of the mounting cart 425 illustrating the whiteboard 450 mounted to the mounting surface 50 and positioned horizontally in accordance with an exemplary embodiment.

Figure 11:
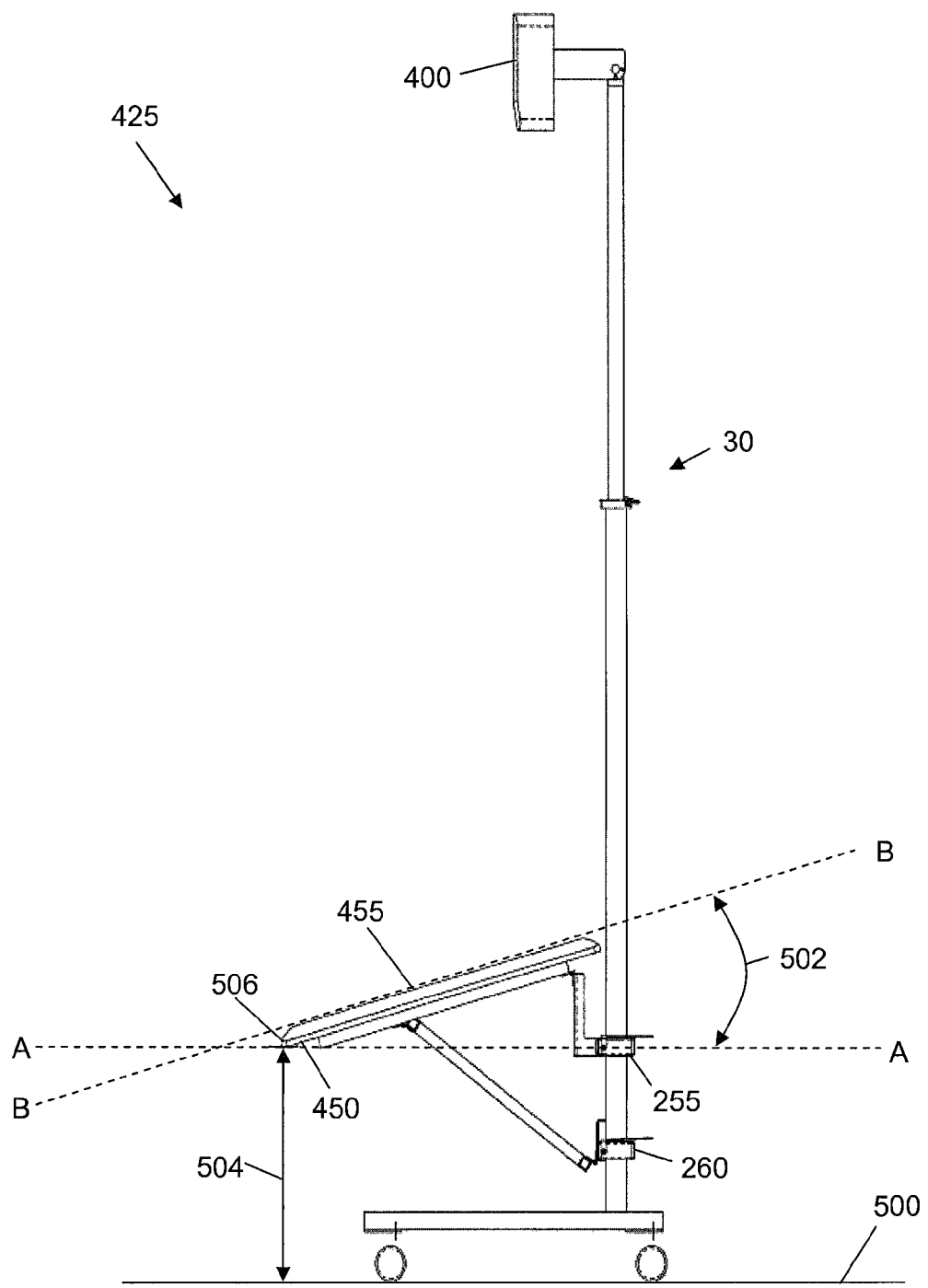
FIG. 11 is a side view of a mounting cart with the whiteboard mounted to the mounting surface and positioned at an angle in accordance with an exemplary embodiment.

FIG. 11 is a side view of the mounting cart 425 illustrating the interactive surface 455 of the whiteboard 450 mounted at an angle 502 relative to a plane A-A which is parallel to a surface 500 in accordance with an exemplary embodiment. The whiteboard 450 is also mounted at a height 504 relative to the surface 500. The height 504 can refer to a distance between a bottom edge 506 of the interactive surface 455 of the whiteboard 450 and the surface 500. Alternatively, the height can refer to a distance between any portion of the whiteboard and the surface. The angle 502 and the height 504 of the interactive surface 455 of the whiteboard 450 relative to the surface 500 can be adjusted by lowering or raising the lower clamp 260 and/or the upper clamp 255.

The interactive surface 455 is capable of being positioned in a plane B-B of a plurality of planes relative to the surface 500. In the exemplary embodiment of FIG. 11, the interactive surface 455 is positioned in the plane B-B such that the angle 502 is approximately fifteen degrees. In an exemplary embodiment, the plurality of planes can include any plane between zero degrees (horizontal) and ninety degrees (vertical) relative to the surface 500. Within the plurality of planes is a plurality of receiving planes. A receiving plane can refer to any plane in the plurality of planes in which the interactive surface 455 is positioned such that the projector 400 mounted to the mounting cart 425 is capable of projecting onto the interactive surface 455. In an exemplary embodiment, an angle of the receiving plane relative to the surface 500 is less than or equal to approximately forty-five degrees when the projector 400 mounted to the second mounting bracket 25 is used to project onto the interactive surface 455. In an alternative embodiment, the receiving plane can be any plane within the plurality of planes.

Figure 12:
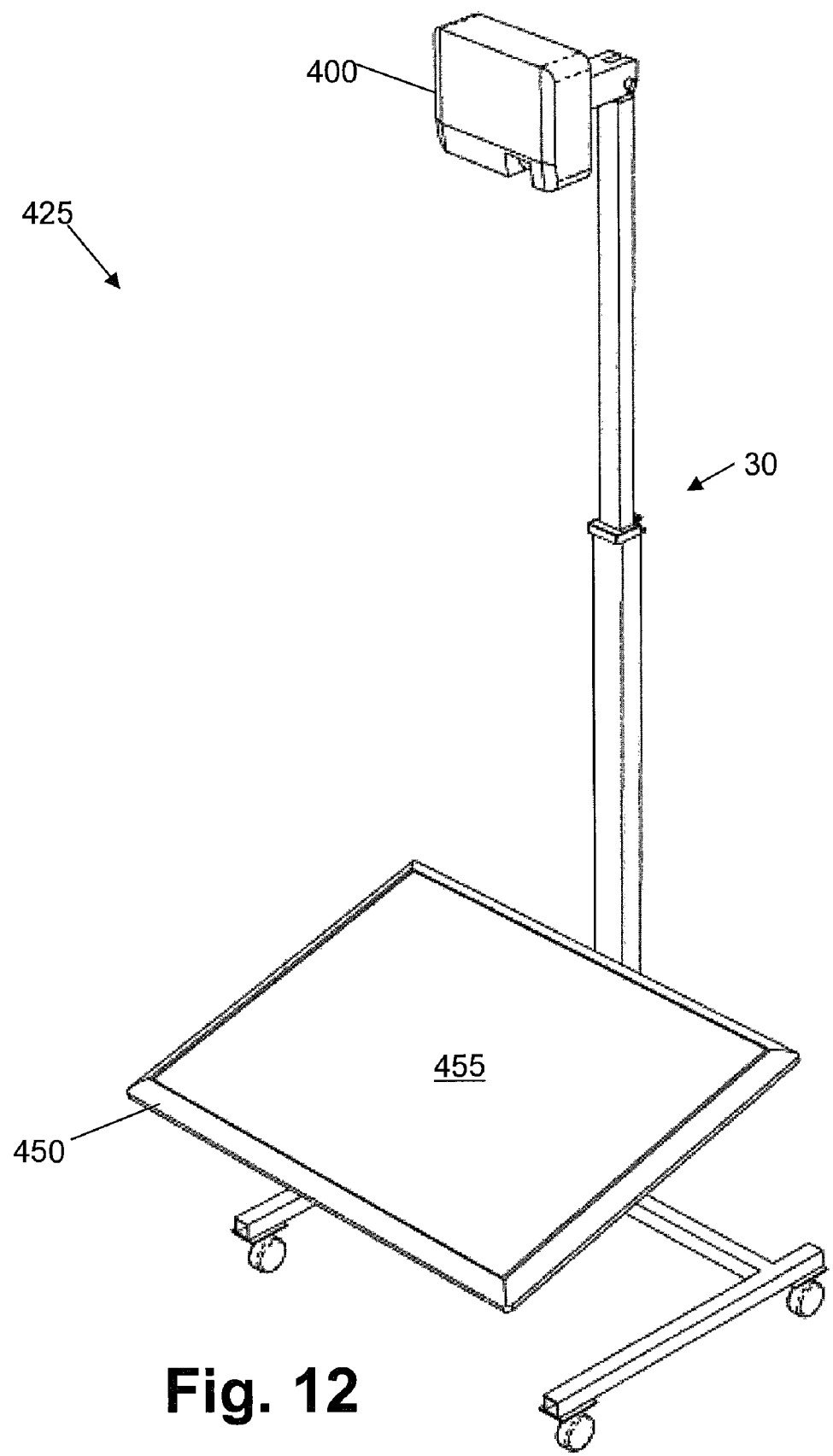
FIG. 12 is a front perspective view of the mounting cart with the whiteboard mounted to the mounting surface and positioned at the angle in accordance with an exemplary embodiment.
Figure 13:
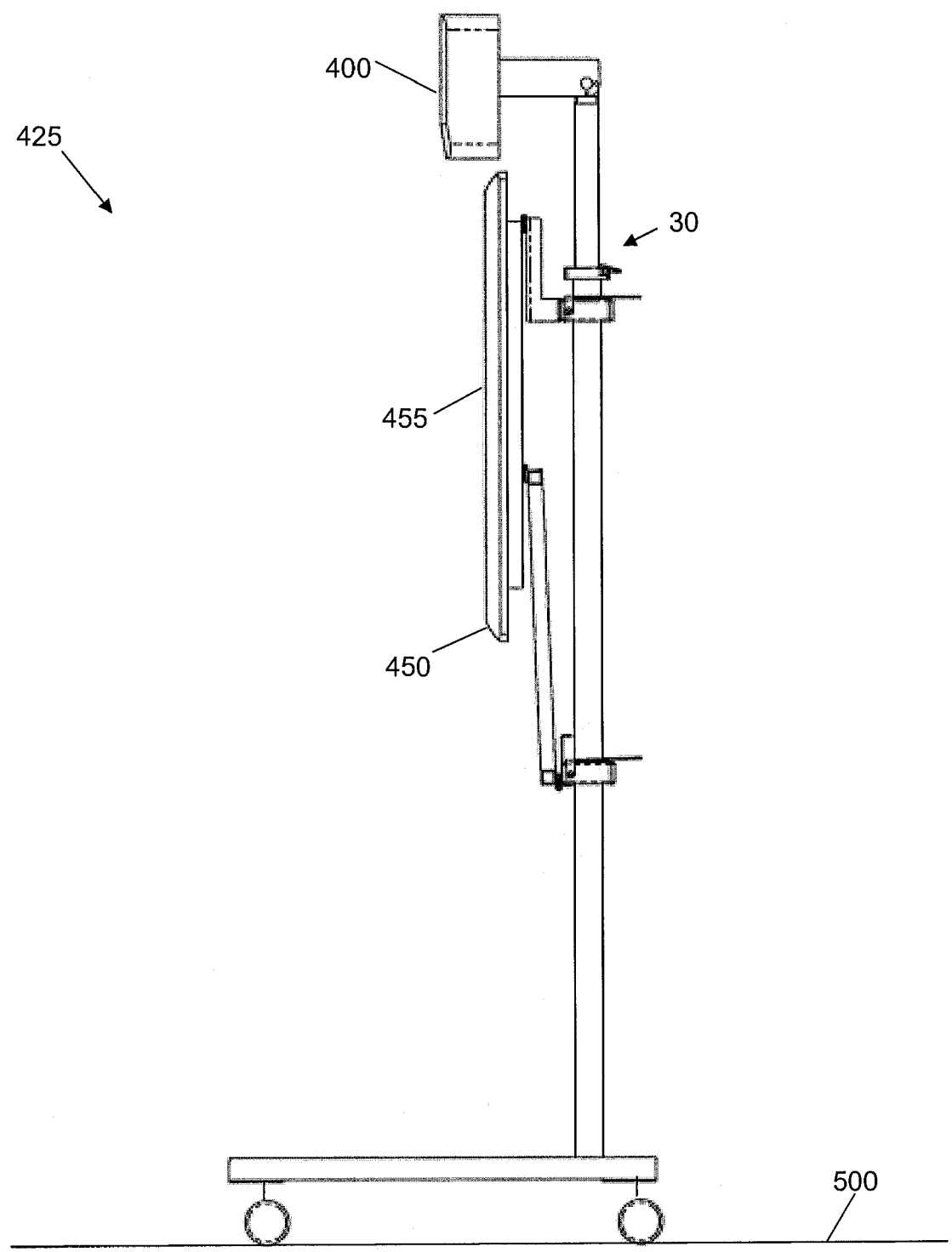
FIG. 13 is a side view of a mounting cart with a whiteboard mounted to the mounting surface and positioned vertically in accordance with an exemplary embodiment.
Figure 14:
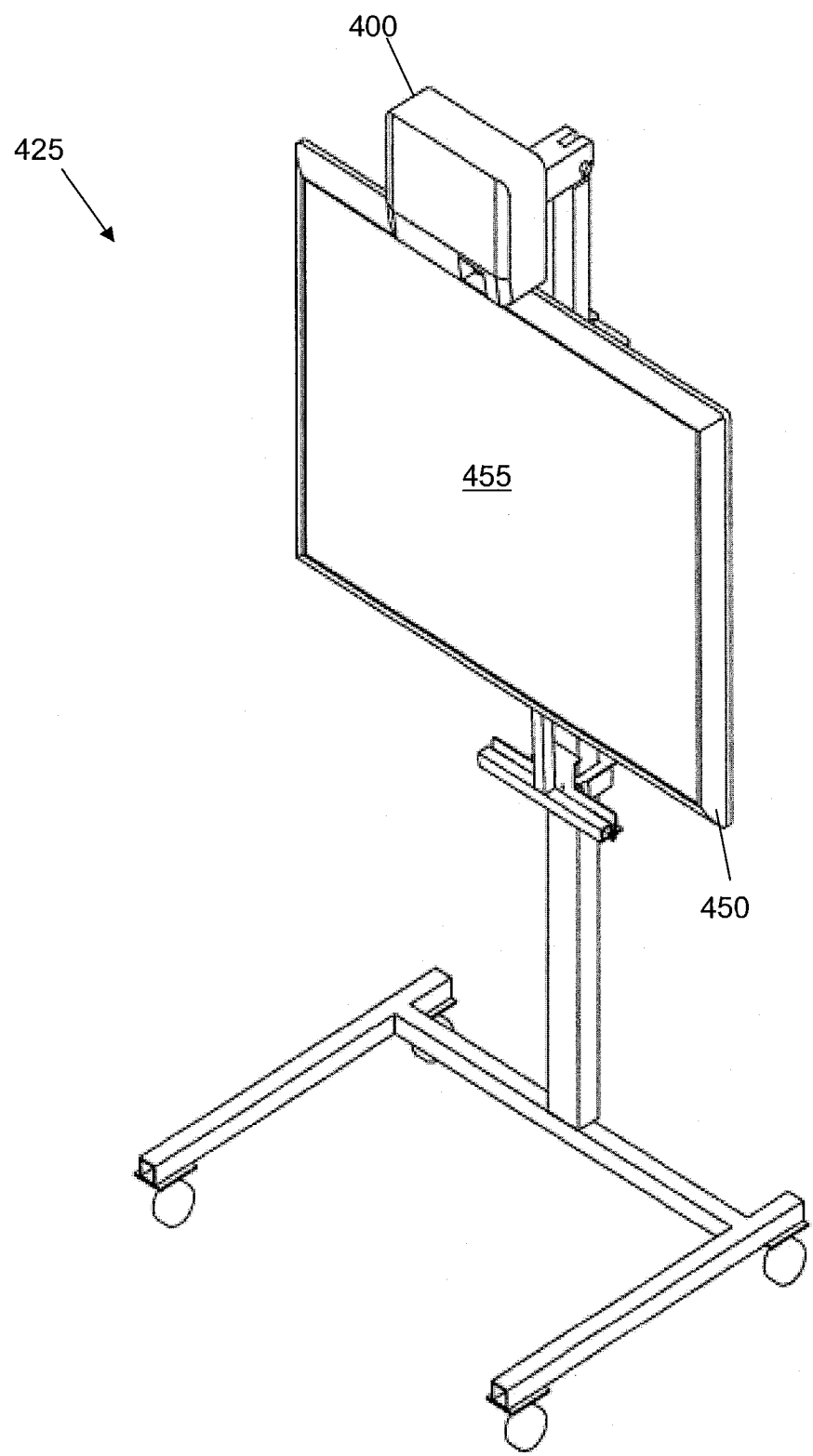
FIG. 14 is a front perspective view of the mounting cart with the whiteboard mounted to the mounting surface and positioned vertically in accordance with an exemplary embodiment.

FIG. 12 is a perspective view of the mounting cart 425 illustrating a whiteboard 450 mounted to the mounting surface 50 and positioned at approximately a fifteen degree angle relative to the surface 500 in accordance with an exemplary embodiment. FIG. 13 is a side view of the mounting cart 425 illustrating the whiteboard 450 mounted to the mounting surface 50 and positioned at a ninety degree angle relative to the surface 500 in accordance with an exemplary embodiment. As such, the whiteboard 450 is capable of receiving images from a projector placed on or mounted to a floor, wall, ceiling, table, etc. FIG. 14 is a perspective view of the mounting cart 425 illustrating the whiteboard 450 mounted to the mounting surface 50 and positioned at a ninety degree angle relative to the surface 500 in accordance with an exemplary embodiment.

Figure 15:
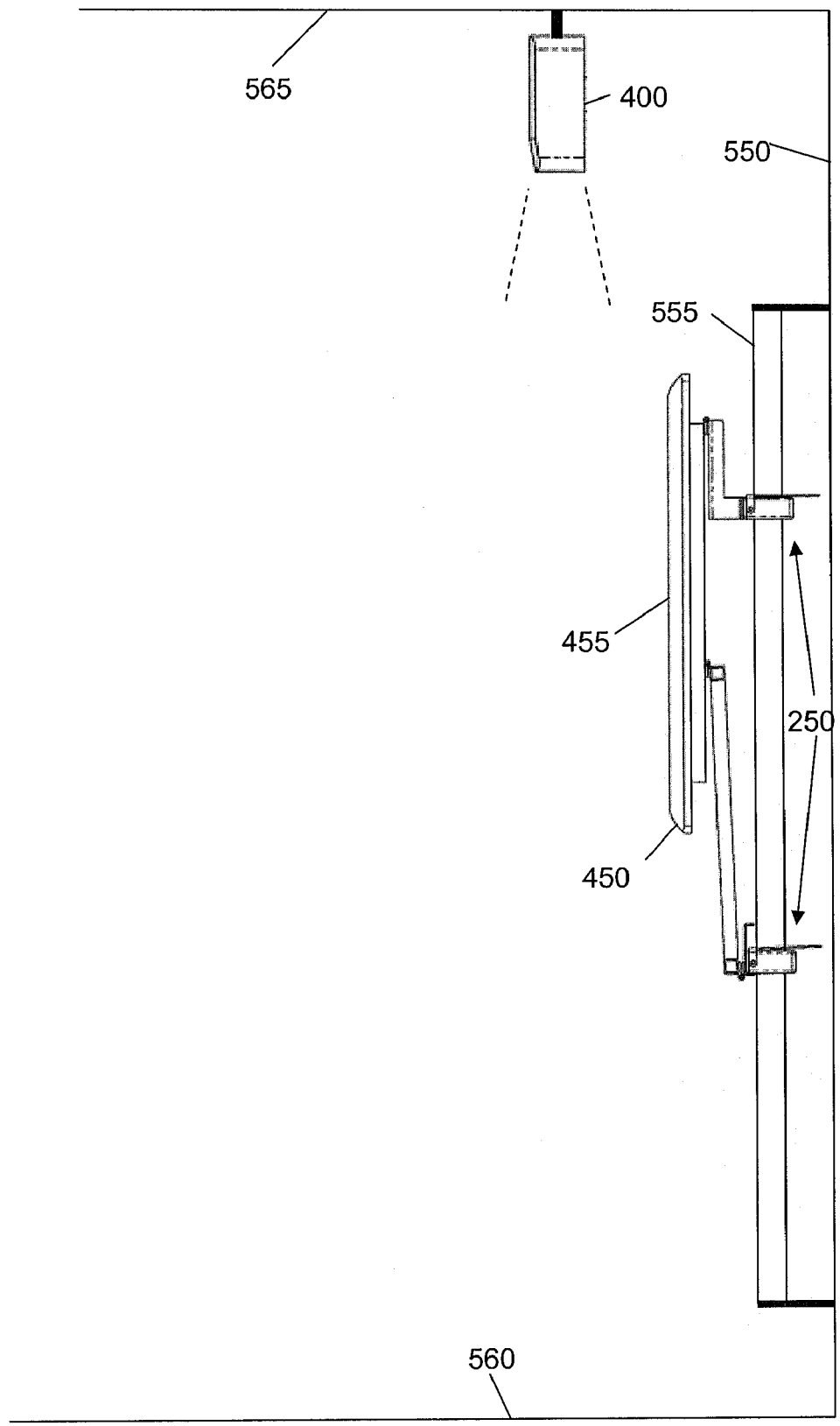
FIG. 15 is a side view of the whiteboard mounted to a wall in accordance with an exemplary embodiment.
Figure 16:
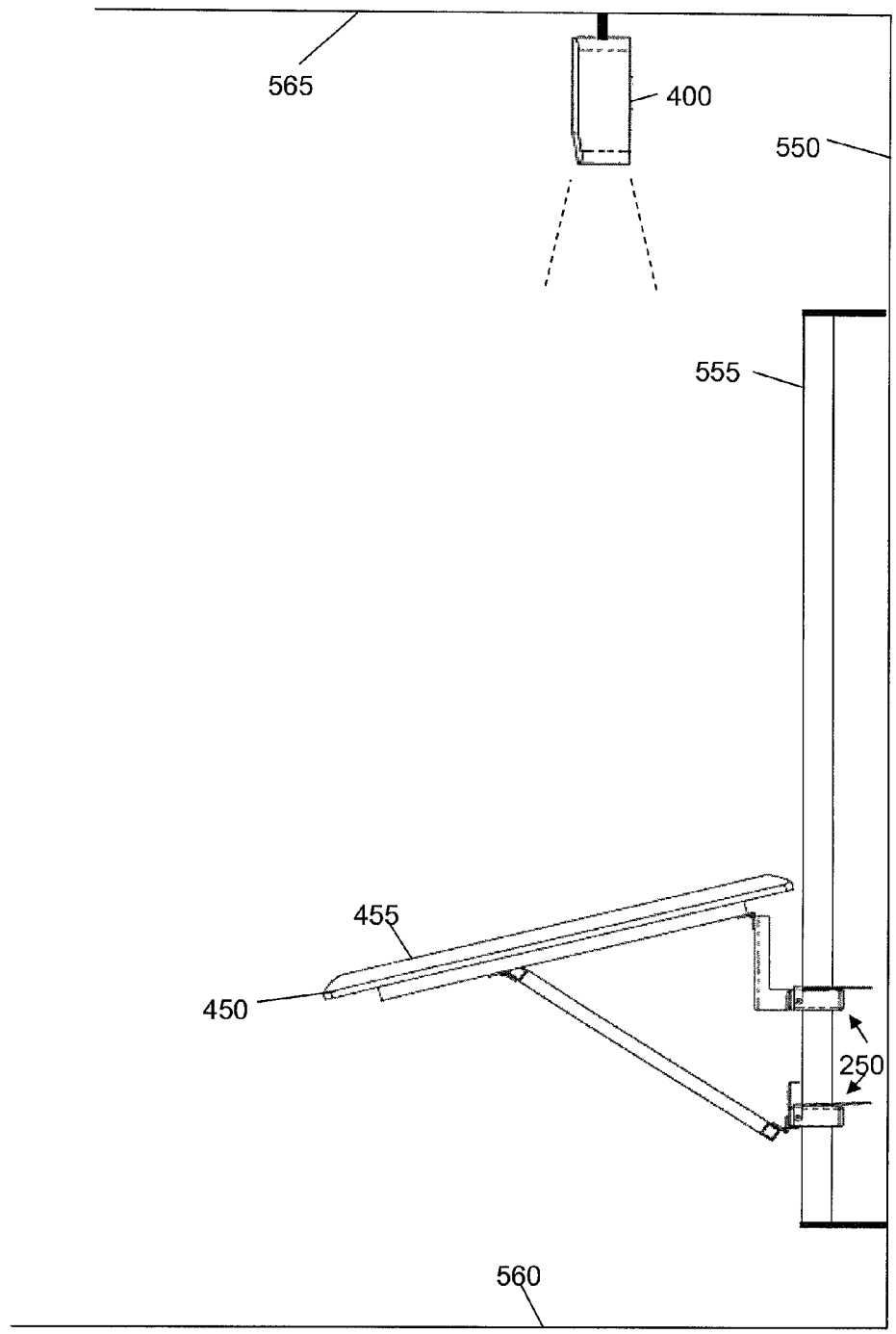
FIG. 16 is a side view of the whiteboard mounted to the wall at an angle in accordance with an exemplary embodiment.

FIG. 15 illustrates a whiteboard 450 mounted to a wall 550 in accordance with an exemplary embodiment. A pole 555 is mounted to the wall 550 and a first mounting bracket 250 is mounted to the pole 555 such that an interactive surface 455 of the whiteboard 450 can be adjusted relative to a surface 560. A projector 400 can be mounted to a ceiling 565 such that images can be projected downward onto the interactive surface 455. Alternatively, a projector can be mounted to or placed on the ceiling, the surface, an opposite wall, a table, etc. such that images can be horizontally projected onto the interactive surface. FIG. 16 illustrates the whiteboard 450 mounted to the wall 550 at an angle in accordance with an exemplary embodiment. The angle is such that the projector 400 mounted to the ceiling 565 is capable of projecting onto the interactive surface 455 of the whiteboard 450.

In an alternative embodiment, the mounting cart can be used to provide a bedridden individual with access to a whiteboard. In such an embodiment, the base of the mounting cart can be positioned under a side of a bed, and the first mounting bracket can be adjusted such that the whiteboard is positioned above and within reach of the bedridden individual. The whiteboard and the projector can both be mounted to the mounting cart such that the whiteboard and the projector are rotated at a ninety degree angle relative to the position illustrated with reference to FIG. 10. As such, the bedridden individual can view and interact with the whiteboard without having to tilt his/her head at an angle.

Figure 17:
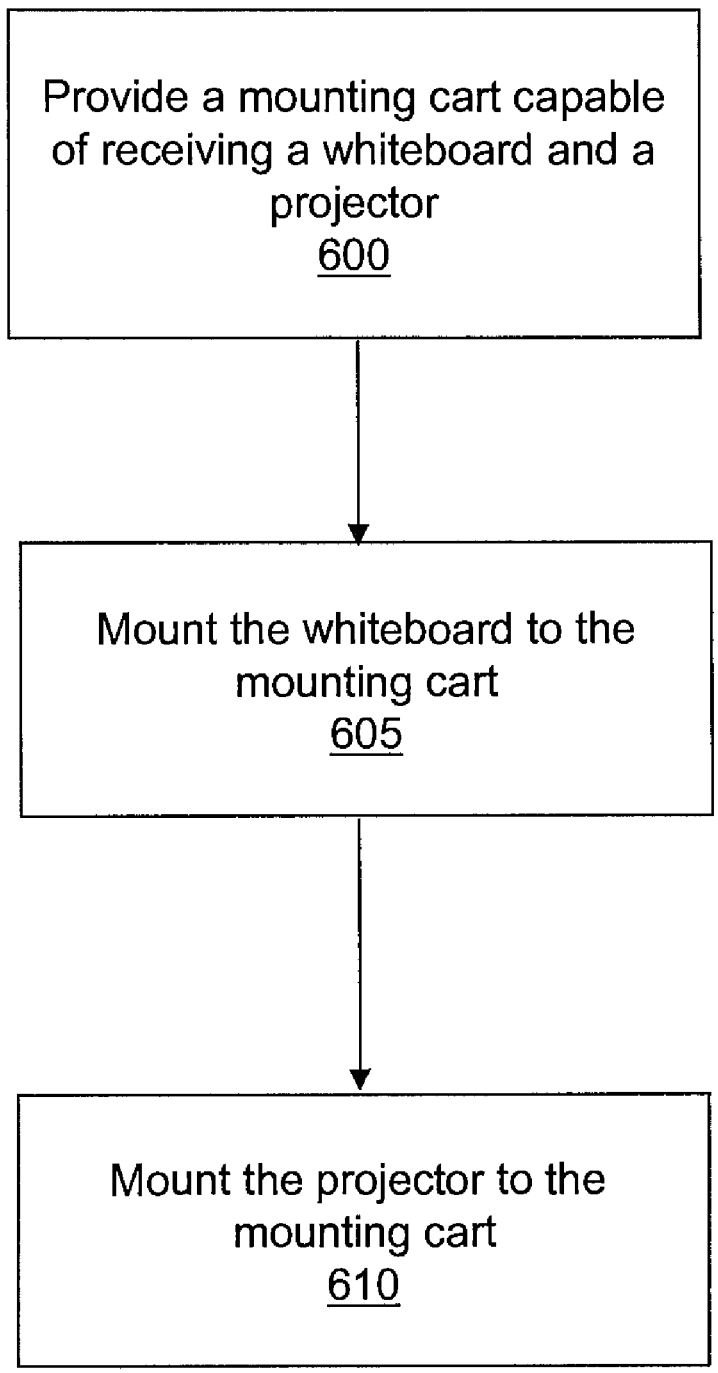
FIG. 17 is a flow diagram illustrating operations performed during an assembly of an interactive work environment in accordance with an exemplary embodiment.

FIG. 17 is a flow diagram illustrating operations performed during an assembly of an interactive work environment in accordance with an exemplary embodiment. Additional, fewer, or different operations may be performed depending on the embodiment. Further, the use of a flow diagram is not meant to be limiting with respect to the order of operations performed. In an operation 600, a mounting cart capable of receiving a whiteboard and a projector is provided. The mounting cart can be any of the mounting carts described with reference to FIGS. 1-14. In an operation 605, the whiteboard is mounted to the mounting cart. The whiteboard can be mounted to a mounting surface of a first mounting bracket of the mounting cart. For example, the whiteboard 450 can be mounted to the first mounting bracket 20, 250. In an operation 610, the projector is mounted to the mounting cart. The projector can be mounted to a mounting plate of a second mounting bracket of the mounting cart. For example, the projector 400 can be mounted to the mounting plate 95 of the second mounting bracket 25.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device for mounting a whiteboard and a projector, the device comprising:
   a base comprising a transport mechanism, wherein the transport mechanism allows the device to be moved from a first location on a surface to a second location on the surface; and
   a pole mounted to the base such that the pole is substantially perpendicular to the surface, wherein the pole includes
   a first mounting bracket for mounting a whiteboard such that an interactive surface of the whiteboard is capable of being positioned in a plane of a plurality of planes, wherein the plurality of planes includes a receiving plane; and
   a second mounting bracket for mounting a projector such that the projector is capable of projecting onto the whiteboard while the interactive surface of the whiteboard is positioned in the receiving plane, wherein the second mounting bracket is mounted to the pole via a pivot mechanism such that an angle of the second mounting bracket relative to the pole can be adjusted.

2. The device of claim 1, wherein the receiving plane is substantially parallel to the surface.

3. The device of claim 1, wherein an angle of the receiving plane relative to the surface is less than or equal to approximately forty-five degrees.

4. The device of claim 1, wherein the plane is substantially perpendicular to the surface.

5. The device of claim 1, wherein the plane is neither substantially parallel nor substantially perpendicular to the surface.

6. The device of claim 1, wherein the pole is a telescoping pole comprising a first pole section and a second pole section and further wherein at least a portion of the first pole section slidably fits into the second pole section such that a distance between the projector and the whiteboard can be adjusted.

7. The device of claim 1, wherein the base comprises a first base member, a second base member mounted to a first end of the first base member, and a third base member mounted to a second end of the first base member.

8. The device of claim 7, wherein the pole is mounted to the first base member.

9. The device of claim 1, wherein the second mounting bracket further comprises a first bracket leg and a second bracket leg mounted to the first bracket leg via a bracket leg adjustment mechanism such that an angle of the second bracket leg relative to the first bracket leg can be adjusted.

10. The device of claim 1, wherein the first mounting bracket comprises an upper clamp slidably mounted to the pole and a lower clamp slidably mounted to the pole such that the upper clamp and the lower clamp are capable of sliding along the pole independent of one another.

11. The device of claim 10, further comprising an upper mounting surface stabilizer, wherein a first end of the upper mounting surface stabilizer is capable of being mounted to the upper clamp and a second end of the upper mounting surface stabilizer is capable of being pivotally mounted to the whiteboard.

12. The device of claim 11, further comprising a lower mounting surface stabilizer, wherein a first end of the lower mounting surface stabilizer is capable of being pivotally mounted to the lower clamp and a second end of the lower mounting surface stabilizer is capable of being pivotally mounted to the whiteboard.

13. The device of claim 1, wherein the first mounting bracket comprises an upper mounting surface stabilizer, a lower mounting surface stabilizer, and a mounting surface capable of receiving the whiteboard, and wherein a second end of the upper mounting surface stabilizer and a second end of the lower mounting surface stabilizer are pivotally mounted to the mounting surface.

14. A device for providing an interactive work environment, the device comprising:

a whiteboard; and a mounting cart, wherein the mounting cart comprises a base comprising a transport mechanism, wherein the transport mechanism allows the device to be moved from a first location on a surface to a second location on the surface; and a pole mounted to the base such that the pole is substantially perpendicular to the surface, wherein the pole comprises a first mounting bracket for mounting the whiteboard such that an interactive surface of the whiteboard is capable of being positioned in a plane of a plurality of planes, wherein the plurality of planes includes a receiving plane; and a second mounting bracket for mounting a projector such that the projector is capable of projecting onto the whiteboard while the interactive surface of the whiteboard is positioned in the receiving plane.

15. The device of claim 14, further comprising the projector.

16. The device of claim 14, wherein an angle of the receiving plane relative to the surface is less than or equal to approximately forty-five degrees.

17. The device of claim 14, wherein the plane is substantially perpendicular to the surface.

18. A method of assembling an interactive work environment, the method comprising:

providing a mounting cart, wherein the mounting cart comprises a base comprising a transport mechanism, wherein the transport mechanism allows the mounting cart to be moved from a first location on a surface to a second location on the surface; and a pole mounted to the base such that the pole is substantially perpendicular to the surface, wherein the pole includes a first mounting bracket for mounting a whiteboard such that an interactive surface of the whiteboard is capable of being positioned in a plane of a plurality of planes, wherein the plurality of planes includes a receiving plane; and a second mounting bracket for mounting a projector such that the projector is capable of projecting onto the whiteboard while the interactive surface of the whiteboard is positioned in the receiving plane; and mounting the whiteboard to the mounting cart.

19. The method of claim 18, further comprising mounting the projector to the mounting cart.

* * * * *